United States Patent
Hezel et al.

(10) Patent No.: US 8,191,855 B2
(45) Date of Patent: Jun. 5, 2012

(54) BYPASS VALVE FOR INTERNAL COMBUSTION ENGINES

(75) Inventors: Bruno Hezel, Stuttgart (DE); Harald Laue, Esslingen (DE)

(73) Assignee: Robert Bosch GmbH, Stuttgart (DE)

(*) Notice: Subject to any disclaimer, the term of this patent is extended or adjusted under 35 U.S.C. 154(b) by 673 days.

(21) Appl. No.: 11/921,618

(22) PCT Filed: Apr. 21, 2006

(86) PCT No.: PCT/EP2006/061736
§ 371 (c)(1),
(2), (4) Date: Jun. 2, 2009

(87) PCT Pub. No.: WO2006/133986
PCT Pub. Date: Dec. 21, 2006

(65) Prior Publication Data
US 2009/0301080 A1 Dec. 10, 2009

(30) Foreign Application Priority Data
Jun. 17, 2005 (DE) .......................... 10 2005 028 141

(51) Int. Cl.
*F16K 31/12* (2006.01)
*F02B 33/44* (2006.01)
(52) U.S. Cl. .................. 251/38; 251/33; 251/44; 60/611
(58) Field of Classification Search .................. 251/33, 251/38, 44; 60/611, 605.1
See application file for complete search history.

(56) References Cited

U.S. PATENT DOCUMENTS

| 4,283,040 | A | * | 8/1981 | Kolze | 251/30.03 |
| 4,534,537 | A | * | 8/1985 | Zukausky | 251/30.03 |
| 4,699,351 | A | * | 10/1987 | Wells | 251/29 |
| 4,995,585 | A | * | 2/1991 | Gruber et al. | 251/30.03 |
| 5,048,790 | A | * | 9/1991 | Wells | 251/30.04 |
| 5,599,003 | A | * | 2/1997 | Seemann et al. | 251/30.03 |
| 6,076,550 | A | * | 6/2000 | Hiraishi et al. | 137/550 |
| 6,234,449 | B1 | * | 5/2001 | Ortner et al. | 251/35 |
| 6,682,316 | B1 | | 1/2004 | Böke | |

FOREIGN PATENT DOCUMENTS

| DE | 25 27 748 | 1/1976 |
| DE | 100 20 041 | 10/2001 |
| EP | 0 416 339 | 3/1991 |
| GB | 2 103 391 | 2/1983 |
| JP | 8232669 | 9/1996 |

OTHER PUBLICATIONS

JPO, Machine Translation for JP-08232669, Sep. 16, 2011.*
Published PCT Application No. WO 2006/133986 dated Dec. 21, 2006.

* cited by examiner

*Primary Examiner* — Quyen Leung
*Assistant Examiner* — Thomas Truong
(74) *Attorney, Agent, or Firm* — Kenyon & Kenyon LLP

(57) ABSTRACT

A bypass valve for internal combustion engines for connecting the pressure side to the intake side of a supercharging device. The bypass valve includes an electromagnetic actuator and a valve housing in which a closing component is movably accommodated. The closing component has a valve body, acted upon by pressure and movable in a flow channel, and a switchable sealing element.

12 Claims, 8 Drawing Sheets

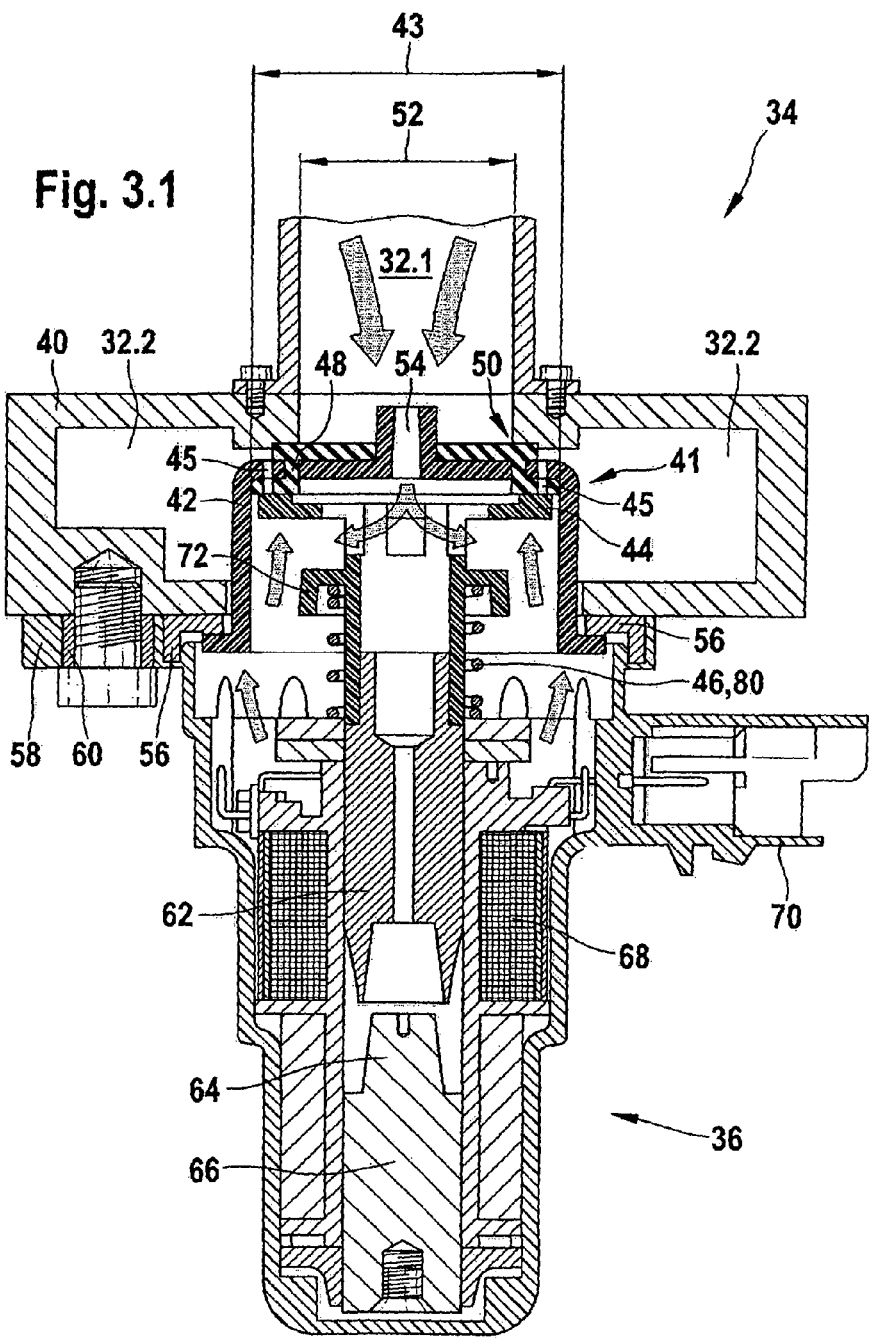
Fig. 3.1

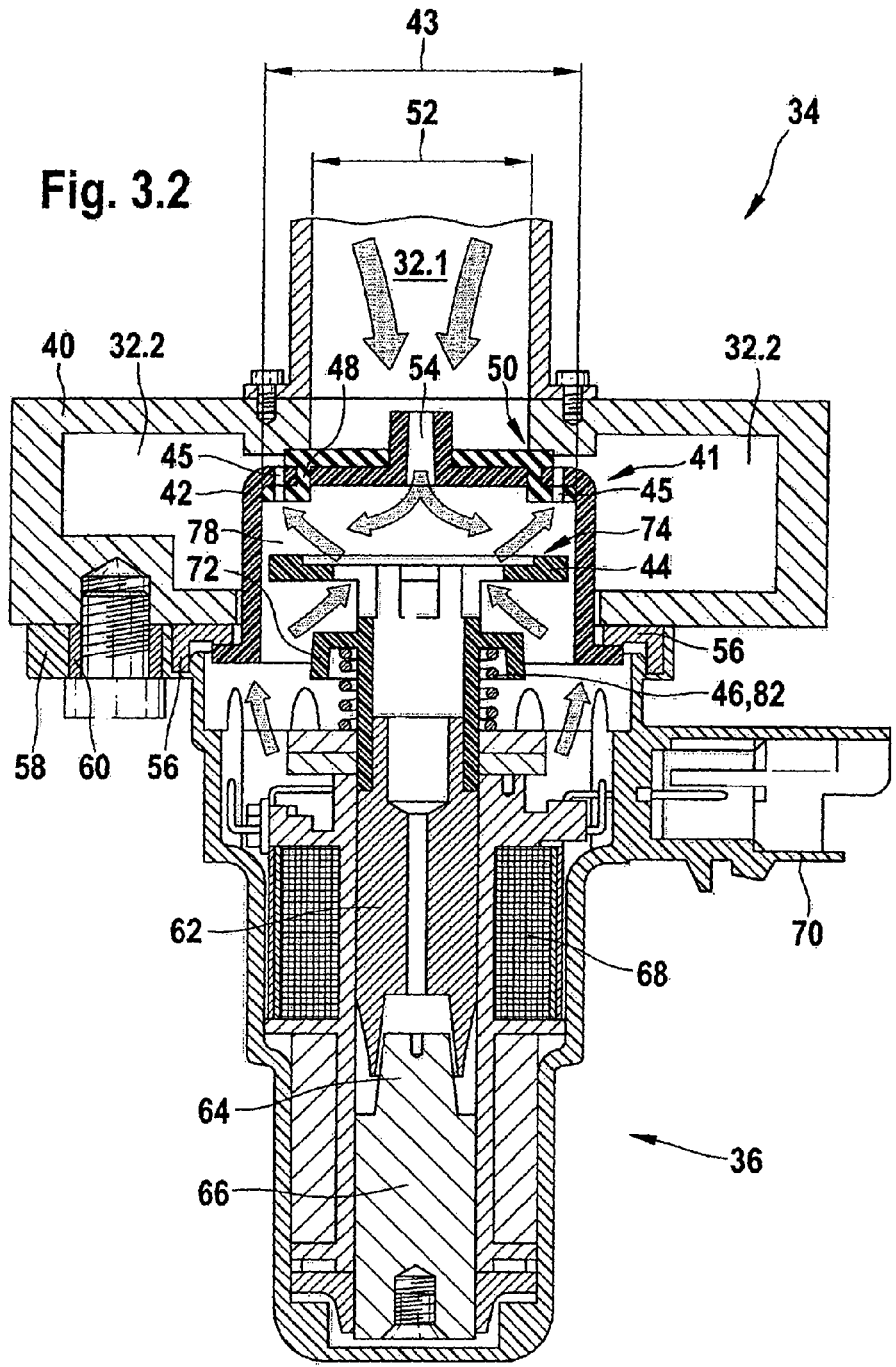
Fig. 3.2

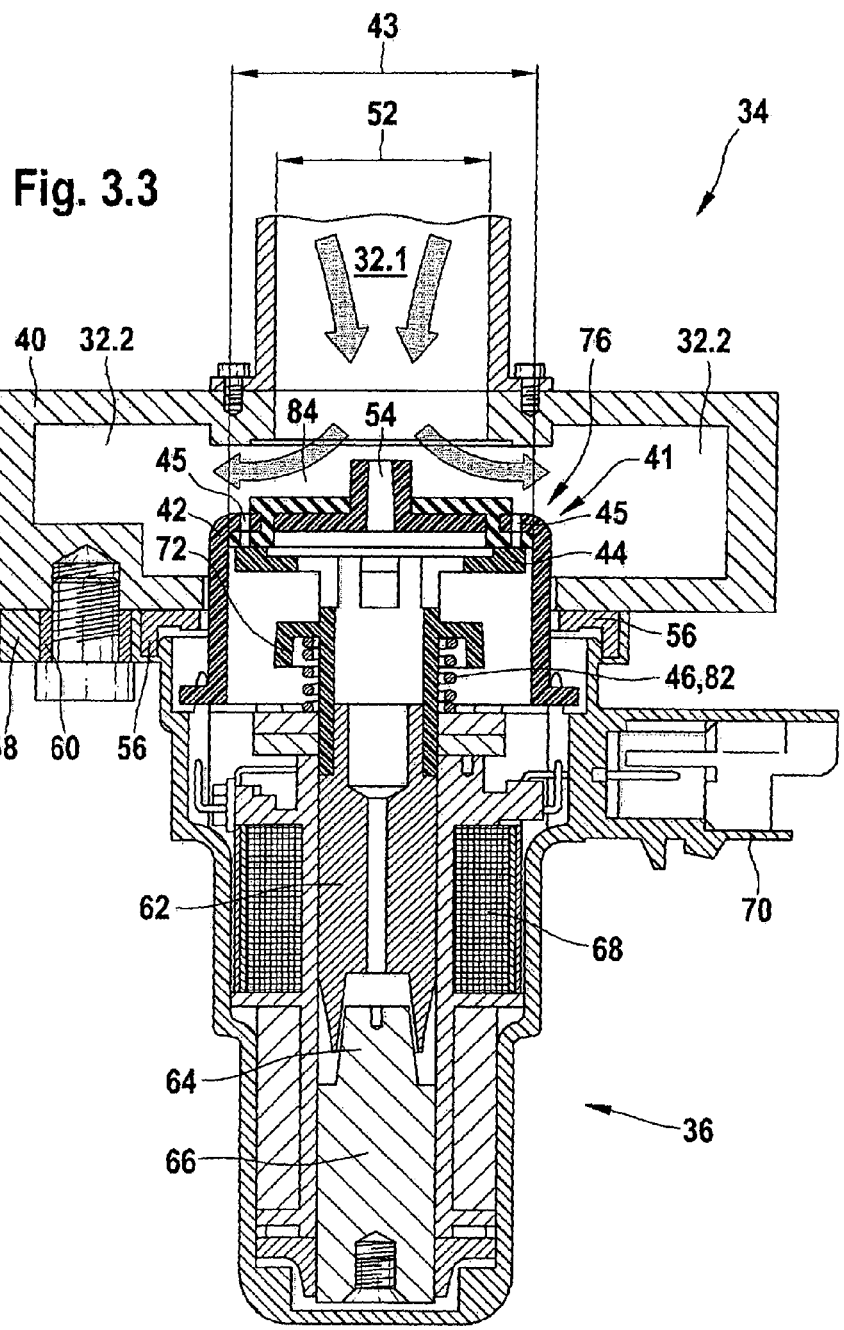
Fig. 3.3

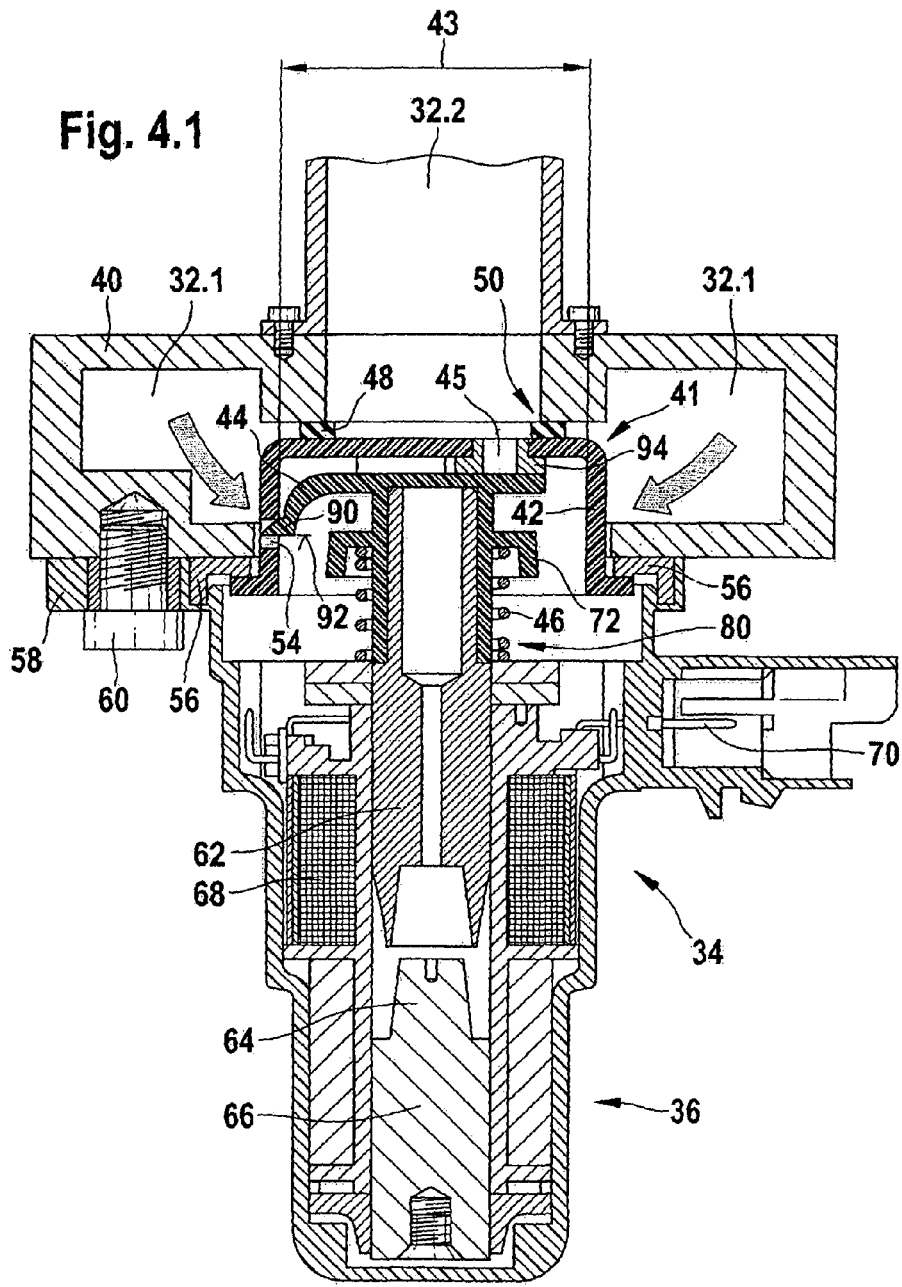
Fig. 4.1

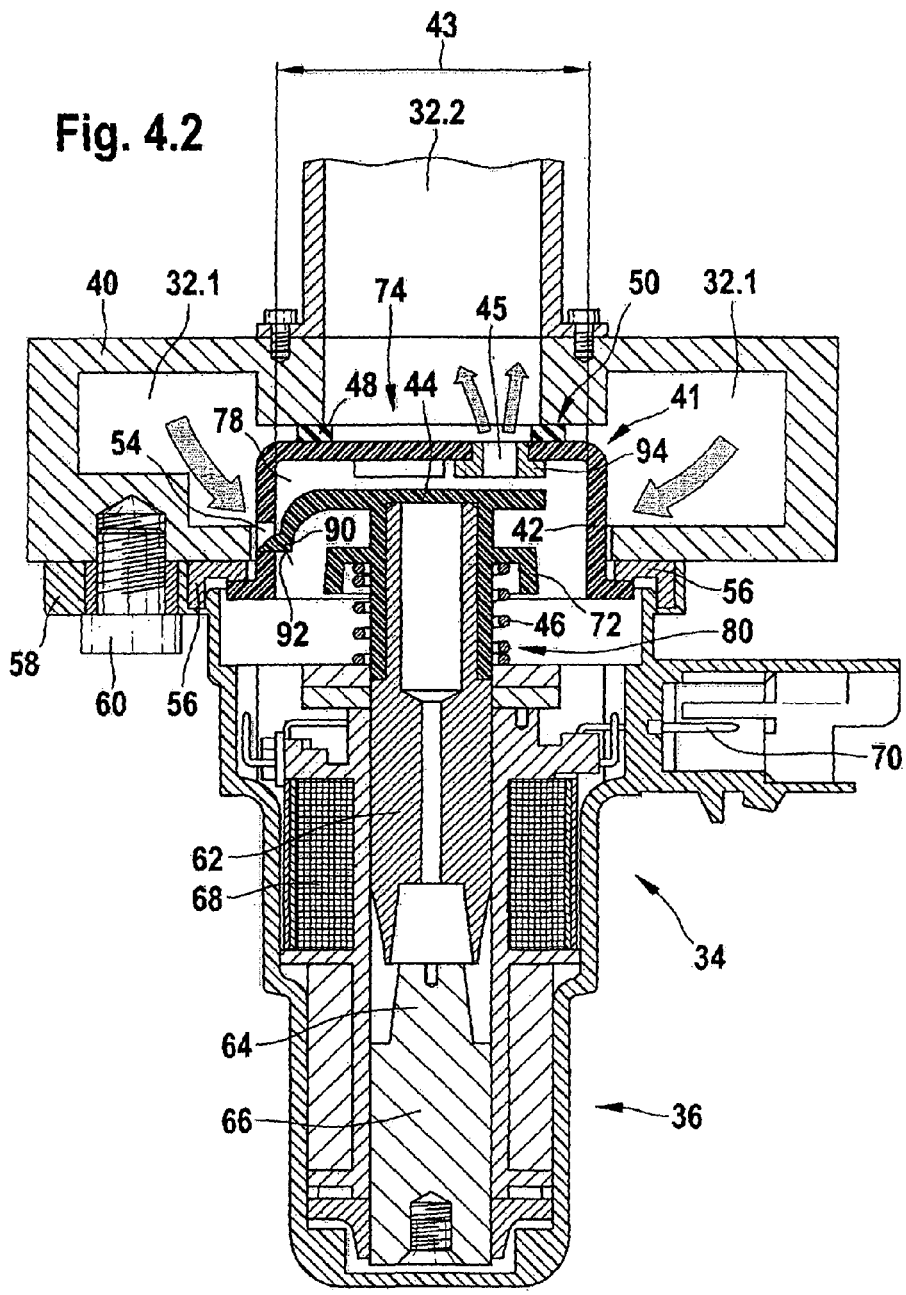
Fig. 4.2

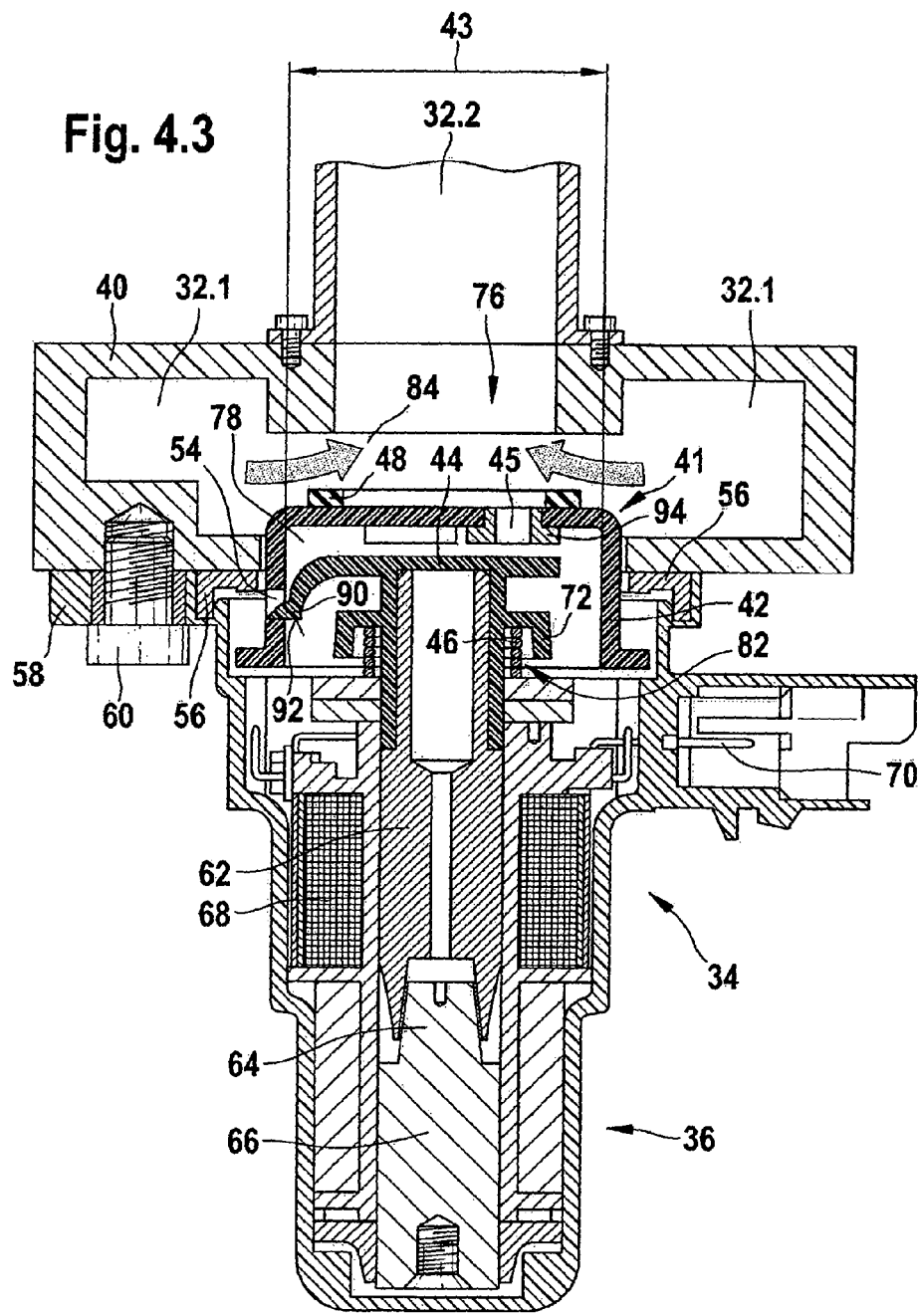
Fig. 4.3

BYPASS VALVE FOR INTERNAL COMBUSTION ENGINES

FIELD OF THE INVENTION

The present invention relates to a bypass valve for internal combustion engines, in particular internal combustion engines which are equipped with a supercharging device.

BACKGROUND INFORMATION

German Patent Application No. 100 20 041 A1 describes a bypass valve body for turbo gasoline internal combustion engines. A connection between the pressure side and the intake side of a boost pressure pump is established via the bypass valve body. The bypass valve body includes a housing, within which a valve rod is movable with the aid of a drive unit, a valve head having a valve closing element being situated on the valve rod. The valve head and the valve rod each have at least one pressure equalization borehole. An electrically operable drive system is used as the drive unit. The electrically operable drive system is preferably an electromagnetic drive. A diaphragm having a circumferential sealing lip is situated between the housing and the valve head as the valve closing element. A connection between the valve rod and the valve head is designed as a universal spherical joint.

In turbocharged internal combustion engines, measures are generally necessary during rapid negative load changes from the close to full-load range, as they occur when a throttle valve is closed, to avoid separation of the airflow at the compressor wheel of a supercharging device which is designed as an exhaust gas turbocharger, for example. An unacceptable acoustic load, in the extreme case even damage to the compressor wheel or to its axial bearings, would occur without these measures. In order to avoid these effects, a bypass system is opened to the compressor element of the supercharging device in this operating situation which allows the compressor element to reduce the air volume flow without pumping and without major instability, i.e., without flow separation.

In the conventional approach, an electrical drive and a pressure-equalized diaphragm are provided. A coil/armature combination having a plunger module is used as the electrical drive. A diaphragm is connected to the armature of the electrical drive which divides a flow path using a sealing geometry. Since an overpressure up to 2 bar may occur on one side, the diaphragm has an essentially pressure-equalized design. The space underneath the diaphragm is short-circuited with the space upstream from the sealing geometry which results in the diaphragm being able to be operated with only little magnetic force—generated by the coil of the electrical drive. This has the advantage that the electrical drive may be designed having relatively small dimensions.

Since the conventional system may be attached to a supercharging device designed as an exhaust gas turbocharger, for example, the electrical drive as well as the moved mass must be designed for accelerations of up to 40 g. To ensure the sealing fit of the diaphragm during an excitation from the outside, the diaphragm is set into the sealing seat using a spring. When the diaphragm is operated, it carries out a lift of a few millimeters. In order to achieve this, the diaphragm is designed as a rolling diaphragm having a bead.

This approach has the disadvantage that the diaphragm is designed as a rolling diaphragm. Due to its assembled position on an internal combustion engine, the rolling diaphragm is exposed to very high temperatures and must therefore be manufactured using a very high-grade elastomer material. On the one hand, the elastomer material must be resistant to fuel and other media in the engine compartment and, on the other hand, it must be resistant in a temperature range between −40° C. and +160° C. Moreover, the diaphragm is exposed to approximately 1.5 million load cycles during its service life. This places very high demands on the churning behavior of such a diaphragm designed as a rolling diaphragm. The churning behavior of a diaphragm depends on the long-term characteristics of the elastomer material used which, due to its use conditions, in particular the temperature and the number of executed load cycles, continuously subsides over the diaphragm's service life, which, in the extreme case of depleted elastic characteristics of the diaphragm material, may result in the diaphragm's failure.

SUMMARY

It is therefore an object of the present invention to provide a bypass valve which ensures a high degree of tightness over the bypass valve's service life with regard to the load cycles to be executed.

According to an example embodiment of the present invention, the bypass valve is designed as a two-stage system which includes a valve body having a seal and a sealing plate which is fixedly connected to the armature of the electrical drive and which pre-stresses the valve body via a pressure spring.

In the proposed approach, the valve body, on the one hand, seals in the axial direction against the housing and, on the other hand, seals a flow channel of the supercharging device using a seal injection molded to the valve plate. The valve body thus takes on a dual sealing function as one component.

The valve body of the proposed bypass valve contains a pressure equalization borehole which extends toward the pressure area of the exhaust gas turbocharger in such a way that the built-up boost pressure is able to propagate underneath the valve body in the housing of the bypass valve in the area of the drive. Since the projected surface area underneath the valve body is larger than a surface area above the valve body toward the pressure area of the exhaust gas turbocharger, the valve body is pressed onto the respective seals, thereby sealing the bypass valve toward the flow channel.

This makes it possible to manufacture the valve body from plastic or a metallic material, thus making it insensitive to pressure effects, temperature effects, and blow-by parts. The seals used are designed in such a way that the effects of pressure and temperature on the elastomer materials used are negligible. The elastomer materials are exposed only to compression stress over the bypass valve's service life. The proposed bypass valve according to the present invention is characterized by long-term resistance of the valve body with regard to the load cycles necessary and occurring over the bypass valve's service life.

BRIEF DESCRIPTION OF THE DRAWINGS

The present invention is described in greater detail below.

FIG. 3.1 shows the bypass valve according to the illustration in FIG. 2 in its sealed position.

FIG. 3.2 shows the bypass valve according to the illustration in FIG. 2 in a first switching stage.

FIG. 3.3 shows the bypass valve according to the illustration in FIG. 2 in a second switching stage.

FIG. 4.1 shows another embodiment variant of the proposed bypass valve according to the present invention in a state which makes a pressure build-up within the bypass valve possible.

FIG. 4.2 shows the bypass valve according to the illustration in FIG. 4.1 in a first switching stage.

FIG. 4.3 shows the bypass valve according to the illustration in FIG. 4.1 in a second switching state.

DETAILED DESCRIPTION OF EXAMPLE EMBODIMENTS

Figure 1:
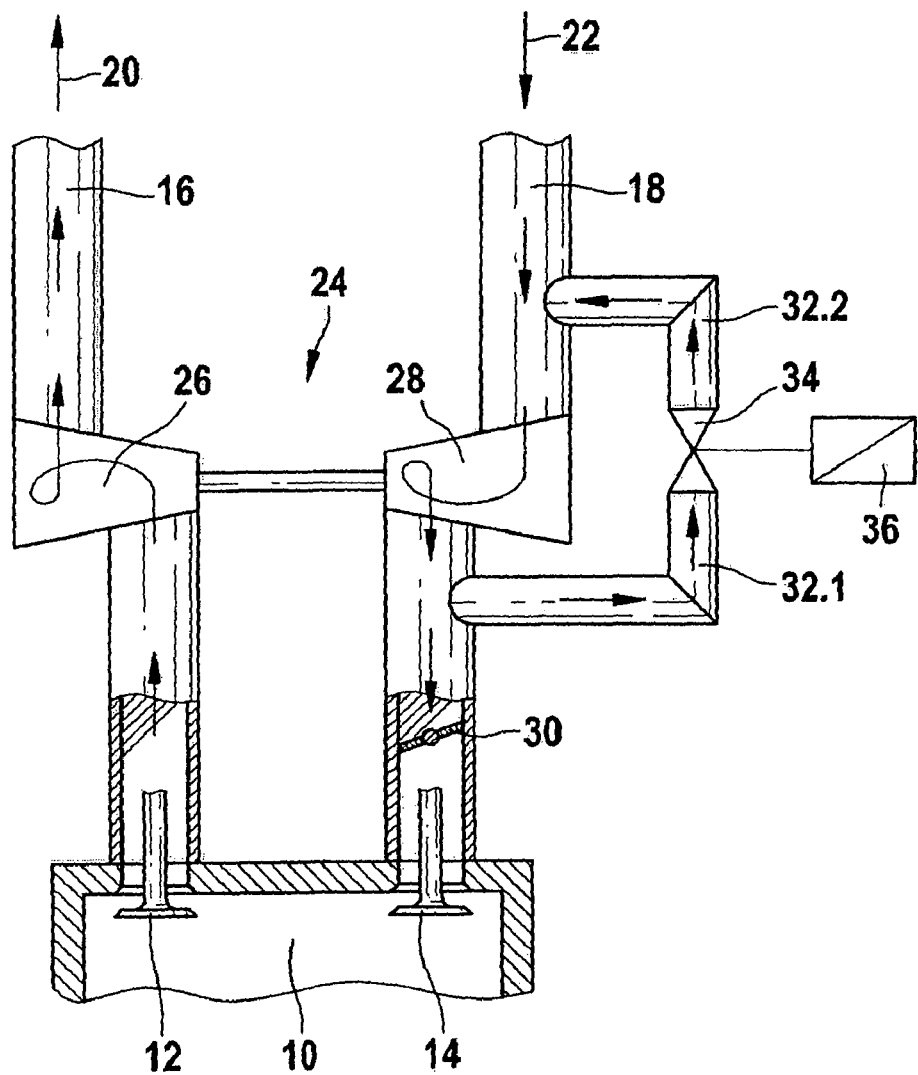
FIG. 1 shows a schematic representation of a supercharging device used on an internal combustion engine.

A supercharging device which is assigned to an internal combustion engine is schematically shown in the illustration according to FIG. 1.

The internal combustion engine, either a self-igniting or an externally igniting internal combustion engine, includes at least one combustion chamber 10. The gas-exchange cycle in combustion chamber 10 of the internal combustion chamber takes place via at least one exhaust valve 12 and at least one intake valve 14. An exhaust gas duct 16 is opened or closed via the at least one exhaust valve 12, so that the exhaust gases can flow from combustion chamber 10 into exhaust gas duct 16. An air supply 18 for fresh air 22 is opened and closed using the at least one intake valve 14. A turbine element 26 of a supercharging device 24 which may be designed as an exhaust gas turbocharger, for example, is situated within exhaust gas duct 16. Supercharging device 24 additionally includes a compressor element 28 which receives fresh air. A throttle valve 30 is situated between compressor element 28 and the at least one intake valve 14 to combustion chamber 10 of the internal combustion engine. A flow channel 32.1, 32.2 (bypass channel) branches off downstream from throttle valve 30 and discharges upstream from compressor element 28 of supercharging device 24. A bypass valve 34, which is activated by an actuator 36 schematically indicated in FIG. 1, is situated in flow channel 32.1, 32.2. Reference numeral 32.1 indicates the inflow-side section of the flow channel and reference numeral 32.2 indicates the outflow-side section of the flow channel downstream from bypass valve 34.

Figure 2:
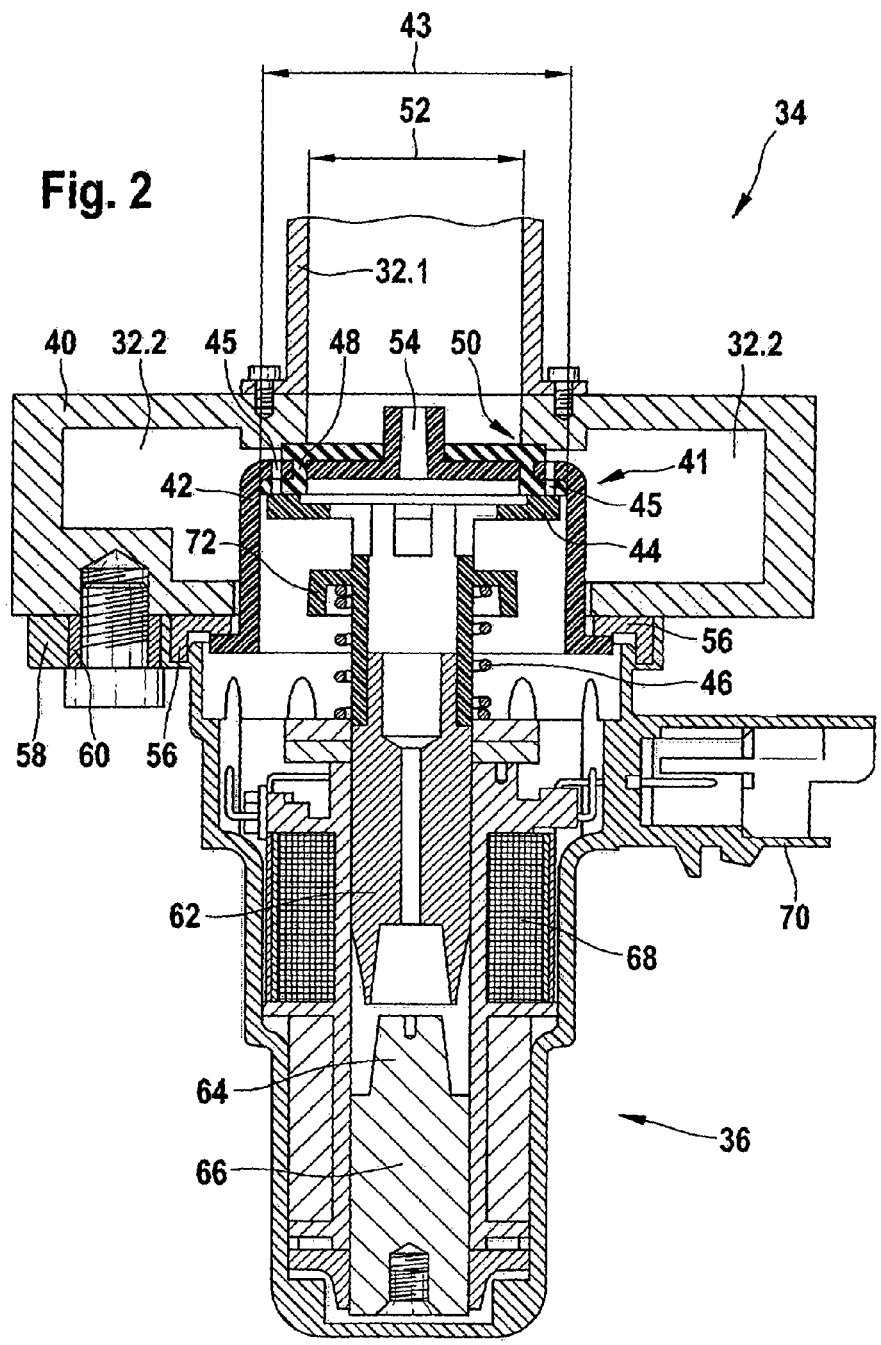
FIG. 2 shows a sectional view of the proposed bypass valve according to an example embodiment of the present invention.

The proposed bypass valve according to the present invention is shown in a sectional view from the illustration in FIG. 2.

A valve housing 40 of bypass valve 34 may be a component of bypass valve 34 as well as a component of the housing of supercharging device 24, such as an exhaust gas turbocharger, for example. A closing component 41 which, on the one hand, has a valve body 42 and, on the other hand, includes a sealing element 44, is situated in valve housing 40. Valve body 42 has a bell-shaped design and encloses sealing element 44, having a disc-shaped design, which may be designed as a sealing plate. In the illustration according to FIG. 2, sealing element 44 is accommodated on an armature 62 of actuator 36. Actuator 36 may be designed as an electromagnet, for example, which includes a coil 68 and an armature 62. Sealing element 44, enclosed by bell-shaped valve body 42, for example, together form a multi-part closing component 41. Armature 62, on which sealing element 44 is accommodated, is acted upon by pressure spring 46. Pressure spring 46 is supported, on the one hand, by valve housing 40 of bypass valve 34 and, on the other hand, by a supporting ring 72 of armature 62. Due to pressure spring 46, armature 62 and thus sealing element 44 are pre-stressed on the bottom side of valve body 42 of closing component 41. As is shown in FIG. 2, the upper side of sealing element 44 rests on at least one seal 48 which is embedded in valve body 42. Sealing element 44 and supporting ring 72, which support pressure spring 46, are preferably designed as one plastic injection molded part which is injection molded in one manufacturing step. The component, including sealing element 44 and supporting ring 72, is rammed onto armature 62. As is apparent from the illustration in FIG. 2, valve body 42 additionally includes an annular seal 48 on its upper side. For improving its fastening on valve body 42, this annular seal 48 is injection molded through valve body 42 at several points. In addition, annular seal 48 is secured over a large surface area to the inside against slipping out. There are boreholes 45 through the cover of valve body 42 and through annular sealing element 48 fastened to it. According to the illustration in FIG. 2, these boreholes 45 are sealed by plate-shaped sealing element 44. According to a first switching stage of bypass valve 34, described in greater detail below, air may be caused to flow into flow channel 32 via these boreholes 45 in annular sealing element 48 and in the cover of valve body 42 when sealing element 44 is drawn back.

Actuator 36 for operating bypass valve 34 may be situated in a housing which is screwed together with valve housing 40 shown in FIG. 2. Armature 62 and plate-shaped sealing element 44, acted upon by pressure spring 46, are pressed against valve housing 40 for sealing. At least one bushing 60 is inserted in a housing flange 58. This bushing 60 acts as a spacer bushing and is used for stabilizing a screw joint between valve housing 40 and a housing flange 58, indicated by the screw shown in FIG. 2.

A sealing area 50 of bypass valve 34 is closed by annular seal 48 of closing component 41. The air flowing toward bypass valve 34 into the outflow side section 32.2 of the flow channel is thus prevented from overflowing. As air flows through the inflow side of section 32.1 of the flow channel, the pressure acts upon the surface of sealing area 50. Due to the fact that a pressure equalization borehole 54 is formed in valve body 42, the pressure also has an effect underneath valve body 42. However, projected surface area 43 underneath valve body 42 is larger compared with the surface area for pressure equalization 52 on the outside of valve body 42, so that an additional closing force acts upon valve body 42 in the direction of the sealing seat.

The surface area for pressure equalization, identified by reference numeral 52, is situated on the upper side of valve body 42 of closing component 41. Since projected surface area 43 on the bottom side of valve body 42 is larger compared with the surface area for pressure equalization identified by reference numeral 52, sealing element 44 is additionally pressed into sealing area 50 in the closed state of valve body 42.

A number of boreholes 45 are additionally situated in valve body 42 of closing component 41 which, when they are unblocked, allow an overflow of air into the outflow side section 32.2 of the flow channel (bypass channel of supercharging device 24). Boreholes 45 in the cover of valve body 42 are axially closed by plate-shaped sealing element 44 as shown in FIG. 2. Finally, valve body 42 of closing component 41 receives a pressure equalization borehole 54. The flow cross section of pressure equalization borehole 54, through which the air flowing in the inflow side of section 32.1 of the flow channel flows toward bypass valve 34, is smaller compared with the flow cross sections of all boreholes 45 in valve body 42. An axial seal 56, which seals valve housing 40 and the housing of actuator 36 including valve body 42 accommodated therein, is situated on the bottom side of bell-shaped valve body 42 in the exemplary embodiment according to FIG. 2.

A housing flange 58 is formed on valve housing 40 in which at least one fastening bushing 60 is introduced.

A plunger module 64, which conically formed on an actuator core 66, is situated below armature 62. Armature 62, movable within valve housing 40 in the vertical direction, is enclosed by coil 68 which is connected to a voltage source via plug-in contacts 70.

The two-stage closing component 41 is shown in its closed position in the illustration according to FIG. 2. In this state, disc-shaped sealing element 44 pre-stresses the at least one seal 48 of valve body 42 via pressure spring 46 when coil 68 is de-energized. Air, flowing into the inside of bypass valve 34 via pressure equalization borehole 54, is not able to flow over into the outflow side section 32.2 of the flow channel in this closed position of the valve due to the closed sealing area 50 and boreholes 45 in the front surface of valve body 42 closed by sealing element 44. In the switching position of bypass valve 34 according to the illustration in FIG. 2 flow channel 32.1, 32.2 is thus closed.

The pressure build-up in the bypass valve is shown in FIG. 3.1.

Coil 68 of actuator 36 is de-energized so that armature 62 including accommodated sealing element 44 is pre-stressed on the at least one sealing element 48 on the bottom side of valve body 42, which has a bell-shaped design, for example, due to the expanded spring (reference numeral 80). Sealing area 50 is sealed toward the inflow side of section 32.1 of the flow channel by the at least one seal 48; moreover, valve housing 40 is sealed against the fresh air entering via pressure equalization borehole 54 by axial seal 56. The fresh air flows through pressure equalization borehole 54 and underneath valve body 42. Air flows around sealing element 44 and is pressurized and the pressure is equalized except for the seals to boreholes 45. Due to axial seal 56 on the open side of valve body 42, designable in a bell shape, for example, it is impossible for air to enter the outflow side section 32.2 of the flow channel. Therefore, valve body 42, movable relative to valve housing 40, reliably seals the inflow side of section 32.1 of the flow channel at two sealing points, namely 50 and 56. It is apparent from the illustration in FIG. 3.1 that pressurized surface area 52 is smaller than projected surface area 43 on the opposite side of valve body 42.

It should be mentioned for the sake of completeness that coil 68 is energized via plug-in contacts 70. Armature 62 contains an opening which is complementary to the geometry of plunger module 64 of actuator core 66. In the closed position, illustrated in FIG. 3.1, plate-shaped sealing element 44 is pre-stressed on the bottom side of valve body 42 due to the expanded state 80 of pressure spring 46 when coil 68 of actuator 36 is de-energized.

FIG. 3.2 shows a first switching stage of the multi-part closing component of the proposed bypass valve according to the present invention.

It is apparent from the illustration in FIG. 3.2 that armature 62 moves into coil 68 when coil 68 of actuator 36 is energized and sealing element 44 is moved vertically downward within valve body 42 which may have a bell-shaped design. In the operating position of bypass valve 34, corresponding to first switching stage 74, sealing element 44, which may have a plate-shaped design, is no longer in contact with the at least one seal 48 of valve body 42. A chamber labeled with reference numeral 78 is thus formed between sealing element 44 and valve body 42. Fresh air flows into chamber 78 via pressure equalization borehole 54. Since boreholes 45, which are formed in the shell of valve body 42 and open into the outflow side section 32.2 of the flow channel, are unblocked in first switching stage 74, air flows out of chamber 78 into the outflow side section 32.2 of the flow channel in the switching condition corresponding to first switching stage 74. Due to the flow cross section of pressure equalization borehole 54 and the sum of the flow cross sections of the plurality of small boreholes formed in the shell of valve body 42, the pressure in chamber 78 drops continuously since less fresh air is able to flow into pressure equalization borehole 54 of chamber 78 than is flowing out of the same into the outflow side section 32.2 of the flow channel. If the pressure, which acts on projected surface area 43 of valve body 42, has dropped so far that the pressure above valve body 42, which acts on surface area 52 for pressure equalization, is greater, second switching stage 76, shown in FIG. 3.3, is reached.

The second switching state of the bypass valve proposed according to the example embodiment of the present invention is shown in FIG. 3.3. In second switching stage 76, valve body 42 is pushed completely downward due to the reduced pressure, which acts on projected surface area 43 of valve body 42, and the pressure acting simultaneously on surface area 52, thereby completely opening a flow cross-section 84 into the outflow side section 32.2 of the flow channel. The total air quantity flowing toward closing component 41 may now flow through flow channel 32.1, 32.2. Since under the condition of second switching stage 76 bypass valve 34 is on the same pressure level, the force of pressure spring 46 is sufficient to close the system again when the voltage at coil 68 is switched off. It is apparent from the illustration in FIG. 3.3 that, on the one hand, valve body 42 unblocks flow cross-section 84 into the outflow side section 32.2 of the flow channel and has, on the other hand, moved partly into valve housing 40. According to the illustration in FIG. 3.3, axial seal 56 is no longer in sealing contact on valve housing 40 in second switching stage 76, but is rather released by valve body 42.

In the closed position according to FIG. 3.1, on the one hand, the inflow side of section 32.1 of the flow channel is closed at sealing area 50 by valve body 42 of closing component 41 and, on the other hand, valve housing 40 is sealed by axial seal 56. Pressure equalization borehole 54 in valve body 42 of closing component 41 makes pressure equalization between supercharging device 24 and bypass valve 34 possible so that the boost pressure may also propagate underneath valve body 42 in the area of actuator 36. Since projected surface area 43 underneath valve body 42 is greater than surface area 52 for pressure equalization on valve body 42, valve body 42 pre-stresses the respective seals in sealing area 50 and valve housing 40 in such a way that the inflow side of section 32.1 of the flow channel is sealed at two points. The advantage of the example bypass valve 34 according to the present invention is that valve body 42 may be manufactured using either a plastic material or a metallic material, thereby making it insensitive against the operating parameters pressure/temperature as well as against blow-by parts in particular. Seals 48, 56 are designed in such a way that the effects of pressure and temperature on the elastomer materials are negligible. Moreover, it should be pointed out with regard to the force transmission into sealing elements 48 and 56 that, during operation of bypass valve 34 proposed according to the present invention, these sealing elements are only subjected to compression stress. Bypass valve 34 proposed according to the example embodiment of the present invention may be used in particular as a bypass valve in a supercharging device 24 on an internal combustion engine. Supercharging device 24 may be in particular an exhaust gas turbocharger, a pressure wave charger, a compressor, or a different supercharging device. Bypass valve 34 may also be used at a different point in the intake system of an internal combustion engine.

In contrast to the embodiment variant of bypass valve 34 according to FIGS. 2, 3.1, 3.2, and 3.3, the flow direction in the exemplary embodiment of bypass valve 34 according to FIGS. 4.1 through 4.3 is shown reversed with respect to the flow direction in FIG. 1. Due to this fact, the inflow side of section 32.1 of the flow channel and the outflow side section 32.2 of the flow channel are interchanged in the exemplary embodiment according to FIGS. 4.1 through 4.3, i.e., air flows through bypass valve 34 in the reversed flow direction in the exemplary embodiment according to FIGS. 4.1 through 4.3.

In the illustration according to FIG. 1, bypass valve 34 is shown in a switching state which makes a pressure build-up possible. According to FIG. 4.1, bypass valve 34 includes actuator 36, which is situated in a flange 58, and in turn includes armature 62, plunger module 64, actuator core 66, and solenoid coil 68. Solenoid coil 68 is energized via plug 70 which is flange-mounted on the side of valve housing 40.

According to this exemplary embodiment of bypass valve 34, closing component 41 includes valve body 42 as well as sealing element 44, in a modified specific embodiment. Sealing element 44 is accommodated on armature 62. Armature 62 includes a support surface 72 which supports pressure spring 46. Pressure spring 46 is shown in FIG. 4.1 in its expanded state 80 and, in this switching state of bypass valve 34, it pre-stresses sealing element 44 on sealing area 50 in valve housing 40. Seal 48, attached to the upper side of valve body 42, closes sealing area 50 in such a way that no air is able to flow over from the inflow side of section 32.1 to the outflow side section 32.2 of the flow channel (bypass channel). A seal 94 is installed in valve body 42 of closing component 41 which has at least one borehole 45. During the switching state of bypass valve 34 shown in FIG. 1, this at least one borehole 45 is closed by sealing element 44 which is pre-stressed against seal 94. Unlike in the specific embodiment of sealing element 44, in the exemplary embodiment according to FIGS. 2 and 3.1 through 3.3, sealing element 44 includes at least one catch 90 on which a support surface 52 is formed. The at least one catch 90, which may be attached to the side of sealing element 44, protrudes into a pressure equalization borehole 54 in the shell surface of valve body 42 of closing component 41. Sealing element 44 is preferably designed in such a way that three catches 90 are formed on its circumference at angles offset by 120° to one another. Valve housing 40 of bypass valve 34 and mounting flange 58 are friction-locked to one another via a screw joint which passes through fastening bushing 60. Axial seal 56, which seals the housing of bypass valve 34 in cooperation with valve body 42 of closing component 41, is introduced in mounting flange 58.

In the switching state of sealing element 44 shown in FIG. 4.1, the pressure is equalized via pressure equalization borehole 54 between the inflow side of section 32.1 and the inside of valve body 42. This pressure equalization borehole is partially unblocked by the at least one catch 90, so that air flows from the inflow side of section 32.1 of the flow channel into the interior of valve body 42 via pressure equalization borehole 54. The pressure level in the inflow side of section 32.1 of the flow channel thus also prevails in the inside of valve body 42 which in this state, due to expanded spring 80, is pre-stressed on the bottom side of valve body 42 whose projected surface area is identified by reference numeral 43.

FIG. 4.2 shows the first switching position of the bypass valve according to the exemplary embodiment in FIG. 4.1. It is apparent from the illustration in FIG. 4.2 that in this switching state sealing element 44 is pre-stressed against the resilience of pressure spring 46 of seal 94 which is introduced in the cover of valve body 42. At the same time, support surface 92 of the at least one catch 90 is in contact with the edge of pressure equalization borehole 54 in such a way that air may continue to flow from the inflow side of section 32.1 of the flow channel via the open pressure equalization borehole 54 into chamber 78. Due to the fact that the upper side of sealing element 44 is distanced from seal 94 in the cover of valve body 42, air flows into the outflow side section 32.2 of the flow channel (bypass channel) via the one borehole 45 in seal 94. Axial seal 56 and valve body 42 are still sealing bypass valve 34. This is achieved in that sealing element 44 is movable relative to valve body 42 in first switching stage 74 shown in FIG. 4.2. In first switching stage 74 of bypass valve 34, shown in FIG. 4.2, pressure equalization occurs between the interior of valve body 42 and the inflow side of section 32.1 of the flow channel (bypass channel).

The second switching stage of bypass valve 34 according to the exemplary embodiment in FIG. 4.1 is shown in the illustration in FIG. 4.3.

By energizing solenoid coil 68 of actuator 36 of bypass valve 34, armature 62 is pulled into solenoid coil 68, thereby moving valve body 42 including sealing element 44 into mounting flange 58. Sealing element 48 on the upper side of valve body 42 of closing component 41, which is pre-stressed on sealing area 50 in first switching stage 74 according to FIG. 4.2, is completely reset from sealing area 50 so that air may flow over from the inflow side of section 32.1 of the flow channel via the unblocked flow cross-section 84 into the outflow side section 32.2 of the flow channel (bypass channel).

In second switching stage 76 of bypass valve 34, shown in FIG. 4.3, closing component 41, valve body 42, and sealing element 44 having at least one catch 90, are reset because solenoid coil 68 is energized, so that pressure spring 46, which exerts pressure on sealing element 44 via support disc 72, assumes its compressed state 82. In second switching stage 76 of bypass valve 34, valve body 42 is reset from axial seal 56 which is introduced in mounting flange 58.

What is claimed is:

1. A bypass valve for an internal combustion engine for connecting a pressure side to an intake side of a supercharging device, comprising:
   an actuator; and a valve housing in which a closing component is movably accommodated, wherein the closing component has a pressurized valve body which is movable in a flow channel, and a switchable sealing element,
   wherein the sealing element cooperates with a pressure equalization borehole on the valve body and has at least one catch which engages into the pressure equalization borehole,
   wherein the valve body has at least one seal having at least one borehole, the seal being situated in a cover surface of the valve body underneath a sealing area.

2. A bypass valve for an internal combustion engine for connecting a pressure side to an intake side of a supercharging device, comprising:
   an actuator; and
   a valve housing in which a closing component is movably accommodated, wherein the closing component has a pressurized valve body which is movable in a flow channel, and a switchable sealing element,
   wherein the valve body contains at least one borehole which may be closed or opened by the switchable sealing element,
   wherein, in a first switching stage of the closing component, the sealing element is withdrawn from the valve body by energizing the actuator for opening the at least one borehole to an outflow side section of the flow channel in the valve body, wherein, in a second switching stage of the closing component, the valve body opens a flow cross-section to the outflow side section of the flow channel after pressure is reduced in a chamber between the valve body and the sealing element, wherein the pressure is reduced in that more air flows out of the chamber via the at least one borehole into the outflow side section of the flow channel than flows into the chamber via a pressure equalization borehole, wherein the valve body has at least one seal on a surface facing a sealing area and cooperates with at least one axial seal on a side of the valve body facing away from the sealing area, wherein the axial seal cooperates with the valve body to seal the valve housing in the closed state of the valve body, in the second switching stage the valve body being withdrawn from the axial seal and the axial seal being released by the valve body, wherein in the closed state of the valve body, the sealing area of the bypass valve being closed and the flowing over of the air flowing towards the bypass valve into the outflow side section of the flow channel being prevented.

3. The bypass valve as recited in claim 2, wherein the valve body has a bell-shaped design and encloses the switchable sealing element.

4. The bypass valve as recited in claim 2, wherein a projected surface area on the valve body is larger than a surface area of the valve body which is acted upon by a pressure of inflowing air.

5. The bypass valve as recited in claim 4, wherein a sum of flow cross sections of the at least one borehole in the valve body is greater than a flow cross section of a pressure equalization borehole in the valve body.

6. The bypass valve as recited in claim 2, wherein the sealing element has a disc-shaped design and is pre-stressable on the valve body via a spring element.

7. The bypass valve as recited in claim 6, wherein the bypass valve is closed by the spring acting upon the sealing element after a coil is de-energized in a pressure-equalized second switching stage.

8. The bypass valve as recited in claim 2, wherein the sealing element cooperates with a pressure equalization borehole on the valve body and has at least one catch which engages into the pressure equalization borehole.

9. The bypass valve as recited in claim 8, wherein the valve body has at least one seal having at least one borehole, the seal being situated in a cover surface of the valve body underneath a sealing area.

10. The bypass valve as recited in claim 8, wherein the sealing element opens an air inlet from an inflow side of a section of the flow channel into a chamber.

11. The bypass valve as recited in claim 10, wherein the sealing element includes a support surface which opens the air inlet into the chamber in a first switching stage of the bypass valve.

12. A method of using a bypass valve of claim 2 in a bypass channel of a supercharging device of an internal combustion engine, designed as an exhaust gas turbocharger, the method comprising:
connecting a pressure side of the supercharging device to an intake side of the supercharging device, the bypass valve including an actuator and a valve housing in which a closing component is movably accommodated, the closing component having a pressurized valve body which is movable in a flow channel, and a switchable sealing element.

* * * * *